United States Patent
Kim et al.

(10) Patent No.: US 11,658,318 B2
(45) Date of Patent: May 23, 2023

(54) CONTROL METHOD AND CONTROL SYSTEM FOR FUEL CELL STOP MODE

(71) Applicants: Hyundai Motor Company, Seoul (KR); Kia Motors Corporation, Seoul (KR)

(72) Inventors: Ki Chang Kim, Seoul (KR); Soon Woo Kwon, Gyeonggi-do (KR); Young Pin Jin, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 284 days.

(21) Appl. No.: 16/366,161

(22) Filed: Mar. 27, 2019

(65) Prior Publication Data

US 2020/0185742 A1 Jun. 11, 2020

(30) Foreign Application Priority Data

Dec. 5, 2018 (KR) .......................... 10-2018-0155184

(51) Int. Cl.
| | |
|---|---|
| *H01M 8/04303* | (2016.01) |
| *H01M 8/04955* | (2016.01) |
| *H01M 8/04992* | (2016.01) |
| *H01M 8/04228* | (2016.01) |
| *H01M 8/04746* | (2016.01) |
| *H01M 8/0438* | (2016.01) |
| *H01M 8/04858* | (2016.01) |

(52) U.S. Cl.
CPC ..... *H01M 8/04753* (2013.01); *H01M 8/0488* (2013.01); *H01M 8/04303* (2016.02); *H01M 8/04425* (2013.01); *H01M 8/04955* (2013.01); *H01M 8/04992* (2013.01); *H01M 8/04228* (2016.02)

(58) Field of Classification Search
CPC .............. Y02E 60/50; H01M 8/04753; H01M 8/04089; H01M 8/0438; H01M 8/04507
See application file for complete search history.

(56) References Cited

U.S. PATENT DOCUMENTS

| | | | |
|---|---|---|---|
| 6,608,463 B1* | 8/2003 | Kelly | H01M 8/0612 320/101 |
| 2003/0022044 A1* | 1/2003 | Inai | H01M 8/04089 429/432 |
| 2003/0091888 A1* | 5/2003 | Goggin | H01M 8/2457 429/456 |
| 2005/0186454 A1* | 8/2005 | Clingerman | H01M 8/04089 429/432 |
| 2005/0233188 A1* | 10/2005 | Kurashima | H01M 8/0668 429/432 |

(Continued)

FOREIGN PATENT DOCUMENTS

KR 101272511 B1 6/2013

*Primary Examiner* — Imran Akram

(74) *Attorney, Agent, or Firm* — Fox Rothschild LLP

(57) ABSTRACT

A control method for a fuel cell stop mode is provided. The method includes measuring an air flow rate supplied to a fuel cell stack and when a fuel cell stop mode is entered, determining an oxygen distribution state between cells included in the fuel cell stack based on the measured air flow rate. Air supply is then supplied to the fuel cell stack or the air supply to the fuel cell stack is interrupted based on the determined oxygen distribution state.

6 Claims, 5 Drawing Sheets

(56) References Cited

U.S. PATENT DOCUMENTS

| | | | |
|---|---|---|---|
| 2006/0166058 A1* | 7/2006 | Kudo | H01M 8/04395 429/413 |
| 2008/0026264 A1* | 1/2008 | Watanabe | H01M 8/04365 429/430 |
| 2008/0081231 A1* | 4/2008 | Kurita | H01M 8/04768 429/513 |
| 2010/0104894 A1* | 4/2010 | Lee | H01M 8/04753 429/9 |
| 2010/0183936 A1* | 7/2010 | Osborne | H01M 8/04395 429/456 |
| 2010/0279184 A1* | 11/2010 | Takeuchi | H01M 8/2475 429/423 |
| 2014/0038071 A1* | 2/2014 | Ogawa | H01M 8/04753 429/425 |
| 2015/0030943 A1* | 1/2015 | Kobayashi | H01M 8/04014 429/410 |
| 2015/0086891 A1* | 3/2015 | Kim | H01M 8/0488 429/429 |
| 2016/0006049 A1* | 1/2016 | Kwon | H01M 8/04992 429/446 |
| 2016/0190620 A1* | 6/2016 | Kwon | H01M 8/04388 429/444 |
| 2016/0336609 A1* | 11/2016 | Yoon | H01M 8/0687 |
| 2017/0346106 A1* | 11/2017 | Faucheux | H01M 8/04768 |
| 2018/0375127 A1* | 12/2018 | Yamazaki | H01M 8/04753 |
| 2018/0375129 A1* | 12/2018 | Yaguchi | H01M 8/04216 |
| 2019/0140293 A1* | 5/2019 | Blanchet | H01M 8/04671 |

\* cited by examiner

CONTROL METHOD AND CONTROL SYSTEM FOR FUEL CELL STOP MODE

CROSS REFERENCE TO RELATED APPLICATION

The present application claims priority to Korean Patent Application No. 10-2018-0155184, filed Dec. 5, 2018, the entire contents of which is incorporated herein for all purposes by this reference.

BACKGROUND

1. Technical Field

The present disclosure relates to a control method and a control system for a fuel cell stop mode, and more particularly, to a technique for reducing variations between cell voltages in a fuel cell stop mode in which power generation of a fuel cell is stopped.

2. Description of the Related Art

A fuel cell, which converts chemical energy into electrical energy using an oxidation-reduction reaction between hydrogen and oxygen supplied from a hydrogen supply device and an air supply device, respectively, includes a fuel cell stack that produces electrical energy, a cooling system that cools the fuel cell stack, and the like. In other words, hydrogen is supplied to an anode of the fuel cell stack, an oxidation reaction of hydrogen is conducted at the anode to generate protons and electrons, and the generated protons and electrons migrate to a cathode through an electrolyte membrane and a separator. In the cathode, the protons and electrons migrating from the anode and oxygen in the air are electrochemically reacted to produce water and electric energy is generated from the flow of electrons.

When the fuel cell stack is exposed to a high potential, a catalyst is deteriorated which deteriorates an irreversible degradation of the fuel cell stack thus degrading overall performance. Accordingly, in the fuel cell stack, a voltage of the fuel cell stack or a cell voltage has an upper limit value in the operation region and the fuel cell stack is operated not to exceed the upper limit value using a bi-directional high voltage direct current-direct current (DC-DC) converter (BHDC).

FIG. 1 illustrates a distribution of cell voltages in a fuel cell stop mode according to the related art. Referring to FIG. 1, in a fuel cell stop mode (FC Stop) in which power generation of a fuel cell is stopped, air supply is stopped to cause a difference in oxygen partial pressure between cells, and thus, there are significant variations between cell voltages. When the fuel cell stop mode is entered at a relatively low air flow rate and oxygen supply amount, the degree of non-uniformity of oxygen between cells increases which further significantly increases the variations between the cell voltages. In particular, some cells may be exposed a high potential which deteriorates the catalyst, degrading performance of the fuel cell stack.

The contents described as the related art have been provided merely to assist in understanding the background of the present disclosure and should not be considered as corresponding to the related art known to those having ordinary skill in the art.

SUMMARY

An object of the present disclosure is to provide a technique of reducing cell voltage variations in a fuel cell stop mode by resolving a difference in oxygen partial pressure between individual cells when the fuel cell stop mode in which power generation of a fuel cell is stopped is entered.

According to an exemplary embodiment of the present disclosure, a control method for a fuel cell stop mode may include: measuring an air flow rate supplied to a fuel cell stack; when a fuel cell stop mode is entered, determining an oxygen distribution state between cells included in the fuel cell stack based on the measured air flow rate; and adjusting air supply to supply air to the fuel cell stack or to interrupt air supply to the fuel cell stack based on the determined oxygen distribution state.

In the measuring of an air flow rate, a flow sensor, configured to measure an air flow rate of an air blower configured to supply air to the fuel cell stack, may be configured to measure the air flow rate. In the determining of an oxygen distribution state, the oxygen distribution state may be determined based on an air supply amount obtained by integrating the measured air flow rate for a predetermined integration time.

Additionally, in the determining of an oxygen distribution state, when the air supply amount is equal to or less than a predetermined reference air amount, oxygen may be determined to be unevenly distributed. In the determining of an oxygen distribution state, an oxygen flow rate in the measured air flow rate may be estimated and an oxygen distribution state may be determined based on an oxygen supply amount obtained by integrating the estimated oxygen flow rate for a predetermined integration time.

Further, in the determining of an oxygen distribution state, when the oxygen supply amount is equal to or less than a predetermined reference oxygen amount, oxygen may be determined to be unevenly distributed. In the determining of an oxygen distribution state, an oxygen consumption amount may be estimated based on a charge amount obtained by integrating an output current of the fuel cell stack for a predetermined integration time, and an oxygen distribution state may be determined based on a remaining oxygen amount obtained by subtracting the oxygen consumption amount from the oxygen supply amount.

In the adjusting of air supply, in response to determining that oxygen is unevenly distributed, the air may be supplied to the fuel cell stack, and in response to determining that oxygen is evenly distributed, the air supply to the fuel cell stack may be interrupted. In the determining of an oxygen distribution state, the oxygen distribution state may be divided into a plurality of stages based on the degree of non-uniformity of an oxygen distribution. In the adjusting of air supply, an additional supply amount of air supplied to the fuel cell stack may be reduced as the oxygen distribution is not uniform. Additionally, in the adjusting of air supply, an air blower configured to supply air to the fuel cell stack may be driven at a predetermined rotation speed, and a driving time of the air blower may be increased as the oxygen distribution becomes unevenly distributed (e.g. not uniform).

According to another exemplary embodiment of the present disclosure, a control system for a fuel cell stop mode may include: a state determination processor configured to determine an oxygen distribution state between cells included in a fuel cell stack based on an air flow rate supplied to the fuel cell stack; and an air supply controller configured to adjust, when the fuel cell stop mode is entered, air supply to supply the air to the fuel cell stack or to interrupt the air supplied to the fuel cell stack, based on the oxygen distribution state determined by the state determination processor.

The control system may further include: a flow sensor configured to measure an air flow rate of an air blower configured to supply air to the fuel cell stack. The state determination processor may be configured to determine that oxygen is unevenly distributed when an air supply amount is equal to or less than a predetermined reference air amount based on an air supply amount obtained by integrating a measured air flow rate. In response to determining that oxygen is unevenly distributed, the air supply controller may be configured to adjust air to be supplied to the fuel cell stack by driving an air blower configured to supply air to the fuel cell stack.

The state determination processor may be configured to divide the oxygen distribution state into a plurality of stages based on the degree of non-uniformity of an oxygen distribution, and the air supply controller may be configured to reduce an additional supply amount of air supplied to the fuel cell stack as the oxygen distribution is not uniform. The air supply controller may be configured to drive an air blower configured to supply air to the fuel cell stack at a predetermined rotation speed and increase a driving time of the air blower as the oxygen distribution is not uniform.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
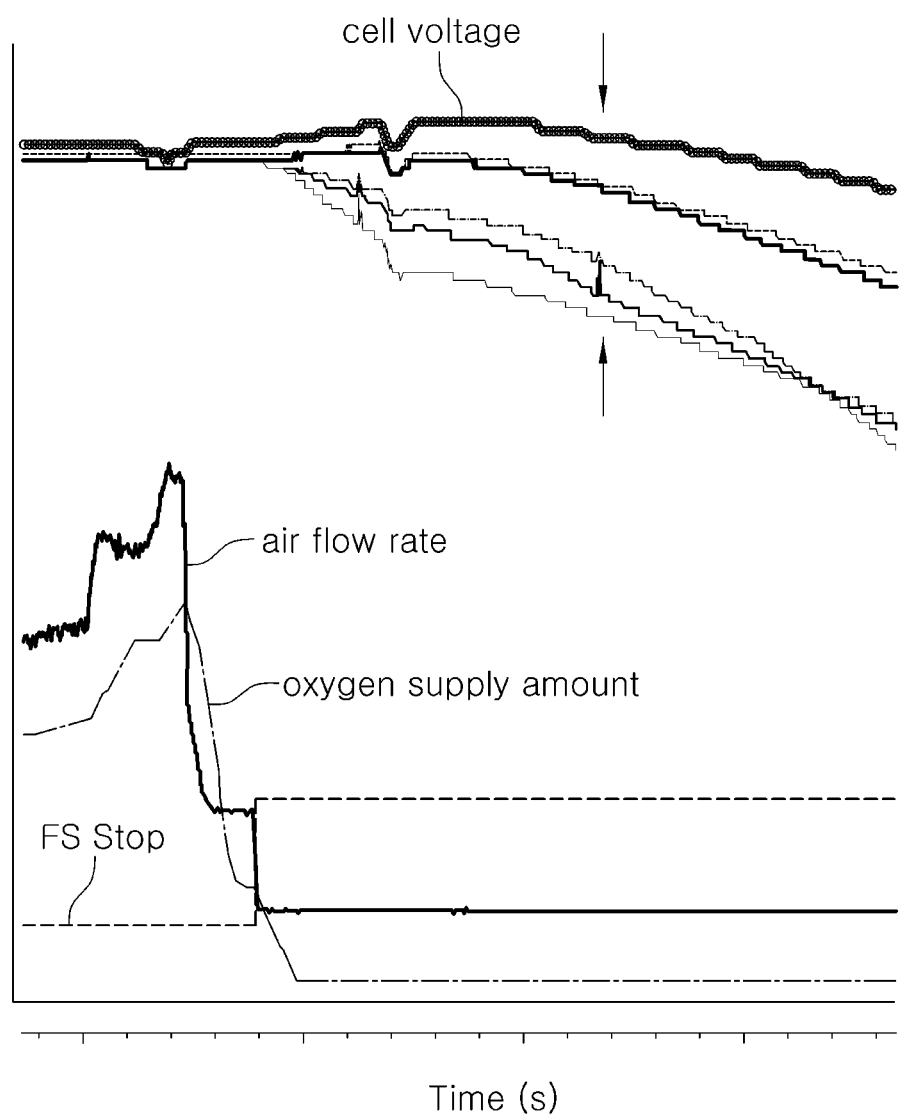
FIG. 1 illustrates a distribution of cell voltages in a fuel cell stop mode according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural or functional descriptions of the exemplary embodiments of the present disclosure disclosed in the specification are exemplified for the purpose of describing the exemplary embodiments of the present disclosure only, and the exemplary embodiments of the present disclosure may be carried out in various forms and should not be construed to limit the exemplary embodiments described herein. In the present disclosure, various modifications may be applied and various forms may be realized, and thus specific exemplary embodiments will be exemplified in the drawings and be described in detail in the specification. However, the present disclosure is not intended to specific disclosure forms, and it will be appreciated that the present disclosure includes all changes, equivalents, or replacements included in the spirit and technical range of the present disclosure.

It will be understood that, although the teens first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. It will be understood that when an element is referred to as being "connected to" another element, it can be directly connected to the other element or intervening elements may also be present. In contrast, when an element is referred to as being "directly connected to" another element, no intervening elements are present. Meanwhile, other expressions describing relationships between components such as "~ between", "immediately ~between" or "adjacent to ~" and "directly adjacent to ~" may be construed similarly.

When it is mentioned that a certain element is "connected to" or "electrically connected to" a second element, the first element may be directly connected or electrically connected to the second element, but it should be understood that a third element may intervene therebetween. On the other hand, when it is mentioned that a certain element is "directly connected to" or "directly electrically connected to" a second element, it should be understood that there is no third element therebetween. The other expressions for describing a relationship between constituent elements such as "between" and "directly between, or "adjacent to" and "directly adjacent to" are construed in the same way. The terms used in the application are used to describe specific embodiments only, and it not intended to limit the present disclosure.

Unless defined in a different way, all the terms used herein including technical and scientific terms have the same meanings as understood by those skilled in the art to which the present disclosure pertains. Such terms as defined in generally used dictionaries should be construed to have the same meanings as those of the contexts of the related art, and unless clearly defined in the application, they should not be construed to have ideally or excessively formal meanings.

Hereinafter, exemplary embodiments of the present disclosure will be described in detail with reference to the accompanying drawings. The same constituent elements in the drawings are denoted by the same reference numerals, and a repeated description of the same elements will be omitted.

Particular, a fuel cell stack receives hydrogen and air from a hydrogen supply system and an air supply system, respectively, and generates electricity through a chemical reaction therein. The fuel cell stack is connected to a motor and a high-voltage battery. Electricity generated in the fuel cell stack is supplied to the motor or the high-voltage battery through a bidirectional high-voltage DC/DC converter (BHDC). Generally, the fuel cell stack is variable in a supplied air flow rate based on a required output or current. In a low current control region in which an output or current required in the fuel cell stack is relatively low, the fuel cell stack is operated not to be exposed to a high voltage through a low flow rate control that reduces an air flow rate supplied to the fuel cell stack.

Further, by adjusting the voltage of the fuel cell stack by operating the BHDC, a voltage of fuel cell stack or a voltage of the cells included in the fuel cell stack is prevented from exceeding a predetermined voltage. Accordingly, durability of the fuel cell stack may be ensured. The fuel cell enters the fuel cell (FC) stop mode based on a required output of the fuel cell stack and a state of charge (SOC) of the high-voltage battery. In the fuel cell stop mode, a fuel cell vehicle is in a running state or in a start-on state but air supply to the fuel cell stack is interrupted to stop power generation of the fuel cell stack. In particular, when a charge amount of the high voltage battery is equal to or greater than a predetermined charge amount and a required output of the fuel cell stack is equal to or less than a predetermined power, the full cell stop mode may be entered.

In the fuel cell stop mode, air supply to the fuel cell stack may be interrupted, and thus, an oxygen distribution state between the cells is uneven, resulting in cell voltage variations due to the occurrence of oxygen partial pressure. In particular, when a flow rate of the air supplied to the fuel cell stack is low before the fuel cell stop mode is entered, such a cell voltage variation is relatively large, causing some of the cells to be exposed to a high potential resulting in a degradation.

Figure 2:
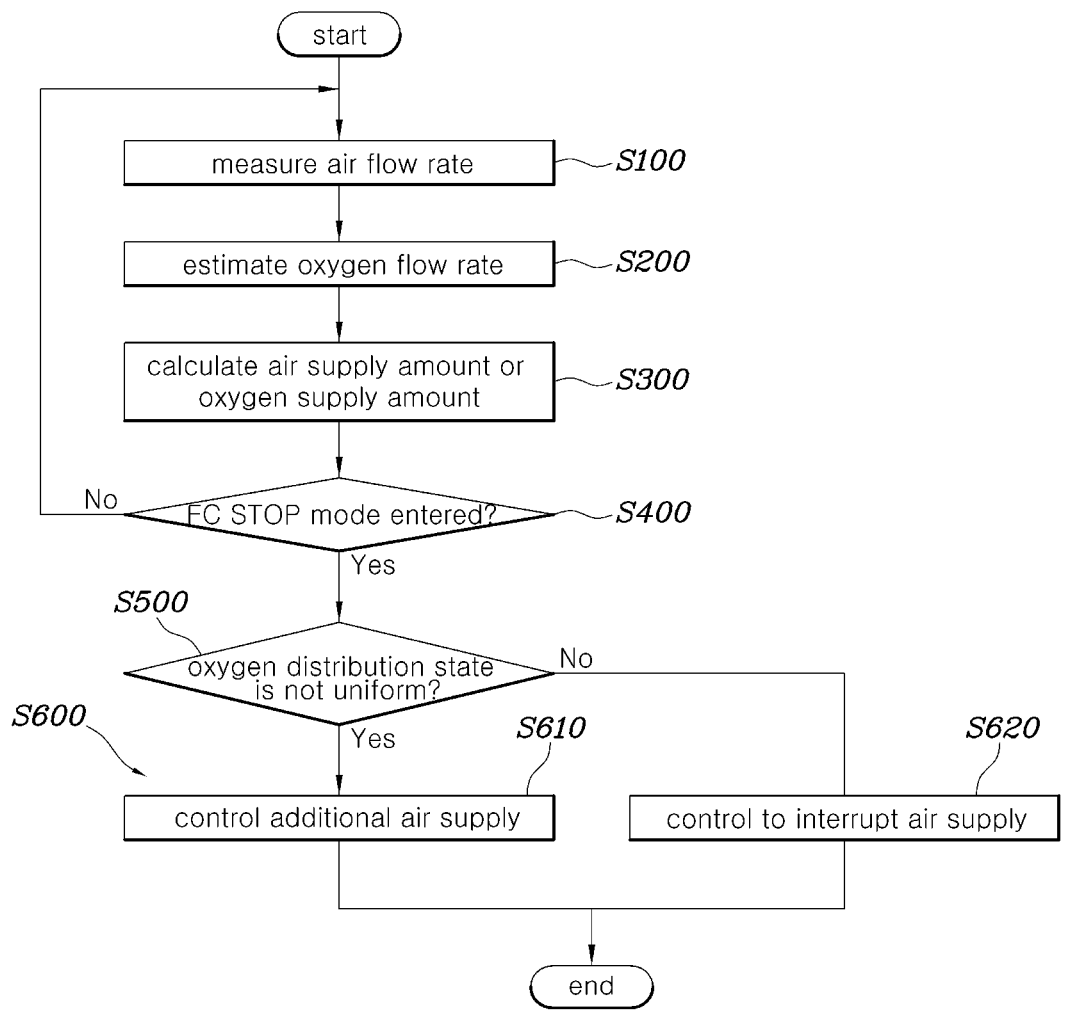
FIG. 2 is a flowchart of a control method for a fuel cell stop mode according to an exemplary embodiment of the present disclosure.

FIG. 2 is a flowchart of a control method for a fuel cell stop mode according to an exemplary embodiment of the present disclosure. The method described herein below may be executed by a controller having a processor and a memory. Referring to FIG. 2, the control method for a fuel cell stop mode according to an exemplary embodiment of the present disclosure may include: measuring an air flow rate supplied to a fuel cell stack (S100); when a fuel cell stop mode is entered (S400), determining an oxygen distribution state between cells included in the fuel cell stack based on the measured air flow rate (S500); and adjusting air supply to supply air to the fuel cell stack or interrupt the air supply to the fuel cell stack (S600).

In operation S100 of measuring an air flow rate, the air flow rate supplied to the fuel cell stack per unit time may be measured in real time. As the air flow rate, a target value of the air flow rate to be supplied to the fuel cell stack by operating an air blower using an output or a current required for the fuel cell stack may be used. Alternatively, the air flow rate may be estimated through a revolution per minute (rpm) of the air blower. In particular, in operation S100 of measuring a flow rate or air, the air flow rate may be measured by a flow sensor configured to measure a flow rate of the air blower that supplies air to the fuel cell stack. Accordingly, the air flow rate may be more accurately measured in real time.

When the fuel cell enters the fuel cell stop mode (S400), in operation S500 of determining an oxygen distribution state, an oxygen distribution state between the cells included in the fuel cell stack may be determined based on the measured air flow rate. As described hereinafter, the oxygen distribution state may be divided into a uniform state or a non-uniform state or may be divided into a plurality of stages. When the fuel cell enters the fuel cell stop mode (S400, in operation S600, air supply is generally adjusted to be immediately interrupted (S620). In other words, typically, when the fuel cell enters the fuel cell stop mode to stop power generation thereof, air supply is immediately interrupted. However, in the present disclosure, air supply may be adjusted such that air is additionally supplied to the fuel cell stack or air supply to the fuel cell stack may be immediately interrupted based on the determined oxygen distribution state (S600).

The oxygen distribution state is affected by an air supply state before the fuel cell stop mode is enteral. In other words, if a minimal amount of air or oxygen is supplied to the fuel cell stack immediately before the fuel cell enters the fuel cell stop mode, the oxygen distribution state of the fuel cell stack is not uniform. In particular, before the fuel cell stop mode is enteral, the fuel cell stack is in a low current region in which the fuel cell stack requires a less current in many cases, the oxygen distribution state of the fuel cell stack may be not uniform due to low flow rate control in which a minimal amount of air is supplied to the fuel cell stack.

Specifically, according to an exemplary embodiment, in operation (S500) of determining an oxygen distribution state (S500), the oxygen distribution state may be determined based on an air supply amount (S300) obtained by integrating the measured air flow rate for a predetermined integration time. In particular, the predetermined integration time may be set to a few seconds in consideration of a time during which a gas is distributed into the fuel cell stack. If the integration time is too short, the amount of air supplied to the cells inside the fuel cell stack may not be properly reflected.

If the integration time is too long, oxygen in the air supplied to the cell may react with hydrogen or discharged, relevance to the amount of oxygen remaining in the cells may be decreased. Therefore, the integration time must be appropriately set.

In particular, when the air supply amount is equal to or less than the predetermined reference air amount, oxygen may be determined to be unevenly distributed. Conversely, when the air supply amount exceeds the predetermined reference air amount, oxygen may be determined to be evenly distributed. The reference air amount may be appropriately set in consideration of the amount of air for a predetermined integration time in a state in which the fuel cell stack sufficiently generates electricity.

According to another exemplary embodiment, in operation (S500) of determining an oxygen distribution state, an oxygen flow rate in the measured air flow rate may be estimated (S200), and an oxygen distribution state may be determined based on an oxygen supply amount (S300) obtained by integrating the estimated oxygen flow rate for the predetermined integration time. The oxygen flow rate may be estimated by multiplying an oxygen concentration to the air flow rate. For example, in general, the oxygen concentration may be estimated based on the assumption that the oxygen concentration in the air is generally about 21%. Alternatively, an oxygen concentration may be measured in real time, and an oxygen flow rate may be estimated using the measured oxygen concentration.

For example, if the air flow rate is about 100 [kg/h], the oxygen flow rate may be estimated to be about 21 [kg/h], and when a molecular weight of oxygen is about 32 [g/mol], the oxygen supply amount for one hour may be about 656 [mol] and the oxygen supply amount per second may be about 0.18 [mol]. In particular, if the oxygen supply amount is equal to or less than the predetermined reference oxygen amount, oxygen may be determined to be unevenly distributed. Conversely, if the oxygen supply amount exceeds the predetermined reference oxygen amount, oxygen may be determined to be evenly distributed.

According to another exemplary embodiment, in operation (S500) of determining an oxygen distribution state, an oxygen consumption amount may be estimated based on a charge amount obtained by integrating an output current of the fuel cell stack for a predetermined integration time, and an oxygen distribution state may be determined based on a remaining oxygen amount obtained by subtracting the oxygen consumption amount from the oxygen supply amount. Accordingly, the oxygen distribution state may be more accurately determined using the remaining oxygen amount in the fuel cell stack.

In other words, the remaining oxygen amount may be calculated by subtracting the oxygen consumption amount from the oxygen supply amount for the predetermined integration time. The oxygen consumption amount may be estimated using the fact that it is proportional to the amount of charge obtained by integrating the output current of the fuel cell stack for the predetermined integration time. Specifically, based on the fact that 4 [mol] of electrons are generated per oxygen molecule 1 [mol] and that electrons are $6.25*10^{18}$ per 1 [C] of charge amount and $6.023*10^{23}$ per 1 [mol] of electron, the oxygen consumption amount consumed for a reaction may be estimated using the charge amount obtained by integrating the output current.

In operation (S600) of adjusting the air supply, in response to determining that oxygen is unevenly distributed, air may be supplied to the fuel cell stack, and in response to determining that oxygen is evenly distributed, air supply to the fuel cell stack may be interrupted (S620). When the fuel cell stop mode is entered, generally, air supply to the fuel cell stack is immediately interrupted. However, in response to determining that oxygen is unevenly distributed, the air supply may be adjusted such that air supply to the fuel cell stack is interrupted after air is additionally supplied to the fuel cell stack (S610). Thus, since air may be additionally supplied when oxygen is unevenly distributed, cell voltage variations may be resolved and durability may be ensured.

Figure 3:
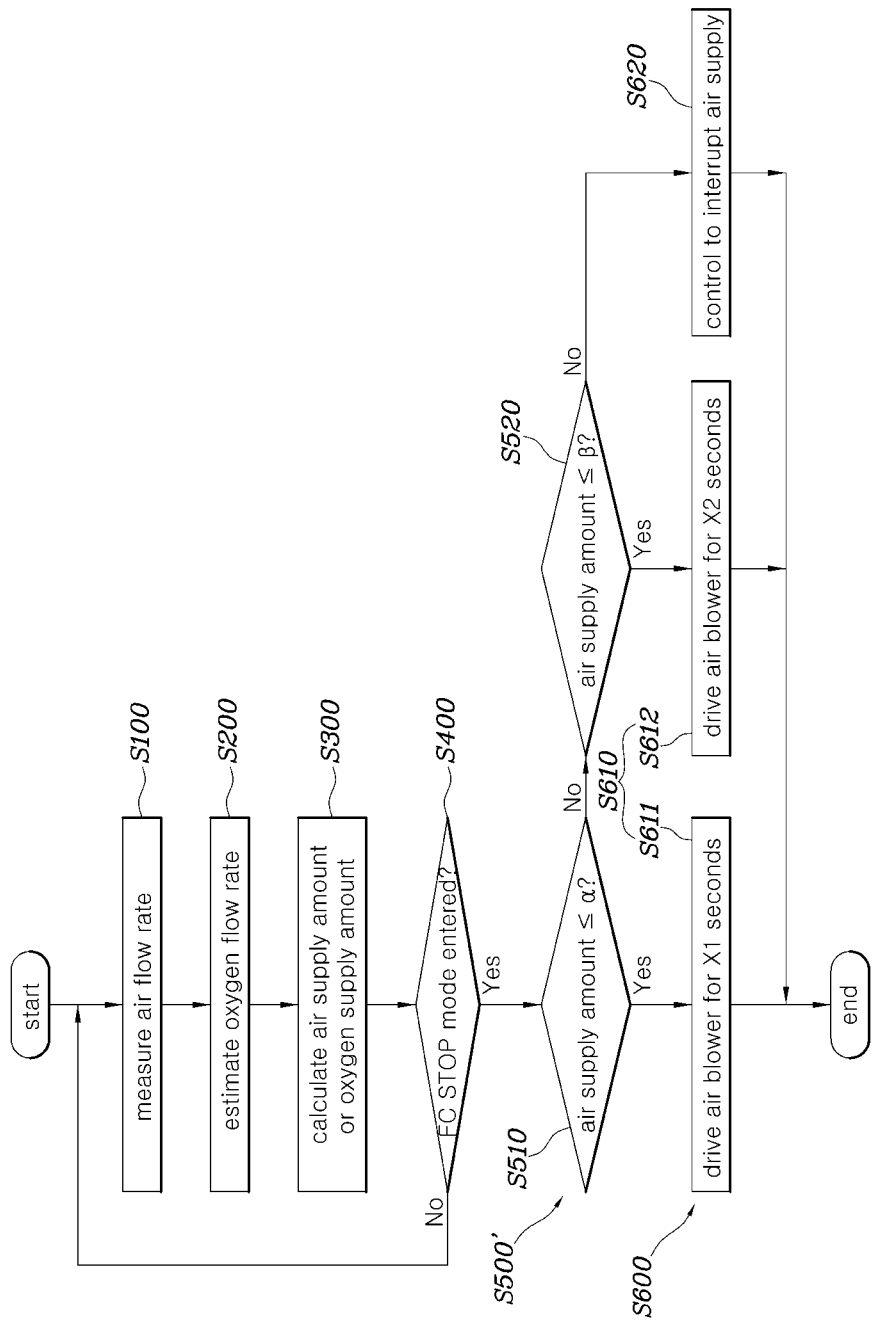
FIG. 3 is a flowchart of a control method for a fuel cell stop mode according to another exemplary embodiment of the present disclosure.

FIG. 3 is a flowchart of a control method for a fuel cell stop mode according to another exemplary embodiment of the present disclosure. Referring further to FIG. 3, in another exemplary embodiment, in operation (S500') of determining an oxygen distribution state, the oxygen distribution state may be divided into a plurality of stages based on the degree of non-uniformity of the oxygen distribution state, and in operation (S600) of adjusting air supply, the air supply may be adjusted such that an additional supply amount of air supplied to the fuel cell stack is reduced as the oxygen distribution becomes non-uniform (e.g., as the distribution becomes uneven) (S610).

Specifically, the oxygen distribution state may be divided into a plurality of stages based on the air supply amount, the oxygen supply amount, or the remaining oxygen amount (S510, S520). In particular, in determining the oxygen distribution state based on the air supply amount, the oxygen supply amount, or the remaining oxygen amount, non-uniformity of the oxygen distribution may be determined to be severe as the air supply amount, the oxygen supply amount, or the remaining oxygen amount is reduced. Accordingly, the air supply may be adjusted such that the additional supply amount of air supplied to the fuel cell stack is increased as the oxygen distribution becomes not uniform.

When the air supply amount, the oxygen supply amount, or the remaining oxygen amount is equal to or less than a first reference value ($\alpha$) (S510), non-uniformity of the oxygen distribution may be determined to be severe and a substantial amount of additional supply of air may be supplied (S611). Additionally, when the air supply amount, the oxygen supply amount, or the remaining oxygen amount exceeds the first value ($\alpha$) and is less than a second reference value ($\beta$) (S520), non-uniformity of the oxygen distribution may be determined to be minimal and a minimal additional supply amount of air may be supplied (S612). When the air supply amount, the oxygen supply amount, or the remaining oxygen amount exceeds the second reference value ($\beta$) (S520), the oxygen distribution may be determined to be uniform and air may not be additionally supplied and air supply may be interrupted (S620).

In operation (S600) of adjusting air supply, the air blower configured to supply air to the fuel cell stack may be driven at a predetermined rotation speed, and here, a driving time of the air blower may be increased as the oxygen distribution becomes not uniform. The air blower may be operated to be driven at a predetermined fixed rotation speed, and an additional supply amount of air may be varied by varying a driving time of the air blower. In other words, the driving time of the air blower may be varied based on an oxygen distribution state divided into a plurality of stages. The driving time of the air blower may be increased such that the additional supply amount of air supplied to the fuel cell stack is increased as the oxygen distribution becomes not uniform.

If the air supply amount, the oxygen supply amount, or the remaining oxygen amount is less than or equal to the first reference value ($\alpha$), the air blower may be driven for x1 seconds (S611), and when the air supply amount, the oxygen supply amount, or the remaining oxygen amount exceeds the first reference value (α) and is equal to or less than the second reference value (β), the air blower may be driven for x2 seconds less than x1 seconds (S612). The air blower may be operated by the controller described herein.

Figure 4:
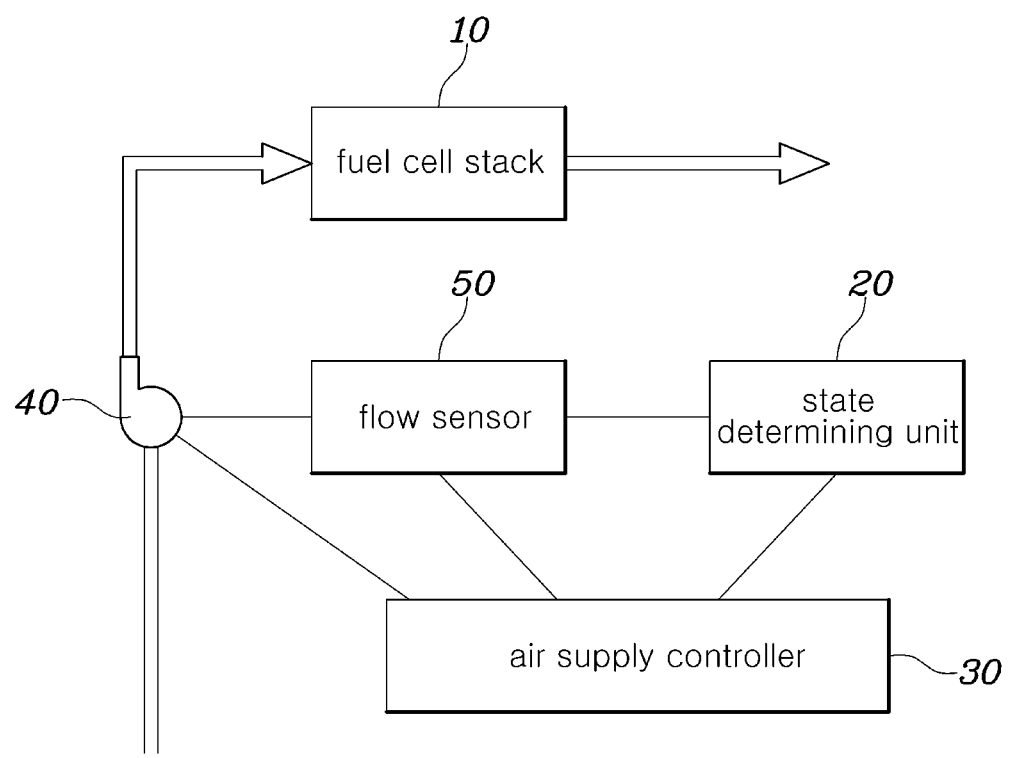
FIG. 4 is a configuration diagram of a control system for a fuel cell stop mode according to an exemplary embodiment of the present disclosure.

FIG. 4 is a configuration diagram of a control system for a fuel cell stop mode according to an exemplary embodiment of the present disclosure. Referring to FIG. 4, the control system for a fuel cell stop mode according to an exemplary embodiment of the present disclosure may include a state determination processor 20 configured to determine an oxygen distribution state between cells included in a fuel cell stack 10 based on an air flow rate supplied to the fuel cell stack 10; and an air supply controller 30 configured to adjust air supply to supply the air to the fuel cell stack 10 or interrupt the air supply based on an oxygen distribution state determined by the state determination processor 20.

The state determination processor 20 or the air supply controller 30 may be a component included in a fuel cell vehicle controller (FCU) such as an electronic control unit (FCU) or may be a sub-controller of the FCU. The state determination processor 20 may be configured to determine an oxygen distribution state between the cells included in the fuel cell stack 10. The air supply controller 30, configured to adjust the air supplied to the fuel cell stack 10, may be configured to adjust a revolution per minute (rpm) of an air blower 40 that supplies air based on a required output of the fuel cell stack 10.

The controls system may further include the flow sensor 50 configured to measure an air flow rate of the air blower 40 that supplies air to the fuel cell stack 10. The flow sensor 50 may be disposed at the air blower 40 and may be configured to measure an air flow rate supplied by the air blower 40 to the fuel cell stack 10 in real time. The state determination processor 20 may be configured to determine that oxygen is unevenly distributed if the air supply amount is equal to or less than the predetermined reference air amount based on the air supply amount obtained by integrating the measured air flow rate for a predetermined integration time. In response to determining that oxygen is unevenly distributed, the air supply controller 30 may be configured to operate the air blower 40 which supplies air to the fuel cell stack 10, to supply air to the fuel cell stack.

The state determination processor 20 may be configure to divide the oxygen distribution state into a plurality of stages based on the degree of non-uniformity of the oxygen distribution, and the air supply controller 30 may be configured to reduce the air supply amount supplied to the fuel cell stack 10 as the oxygen distribution becomes not uniform. The air supply controller 30 may be configured to operate drive the air blower 40, which supplies air to the fuel cell stack 10, at a predetermined rotation speed, and here, a driving time of the air blower 40 may be increased as the oxygen distribution becomes not uniform.

Figure 5:
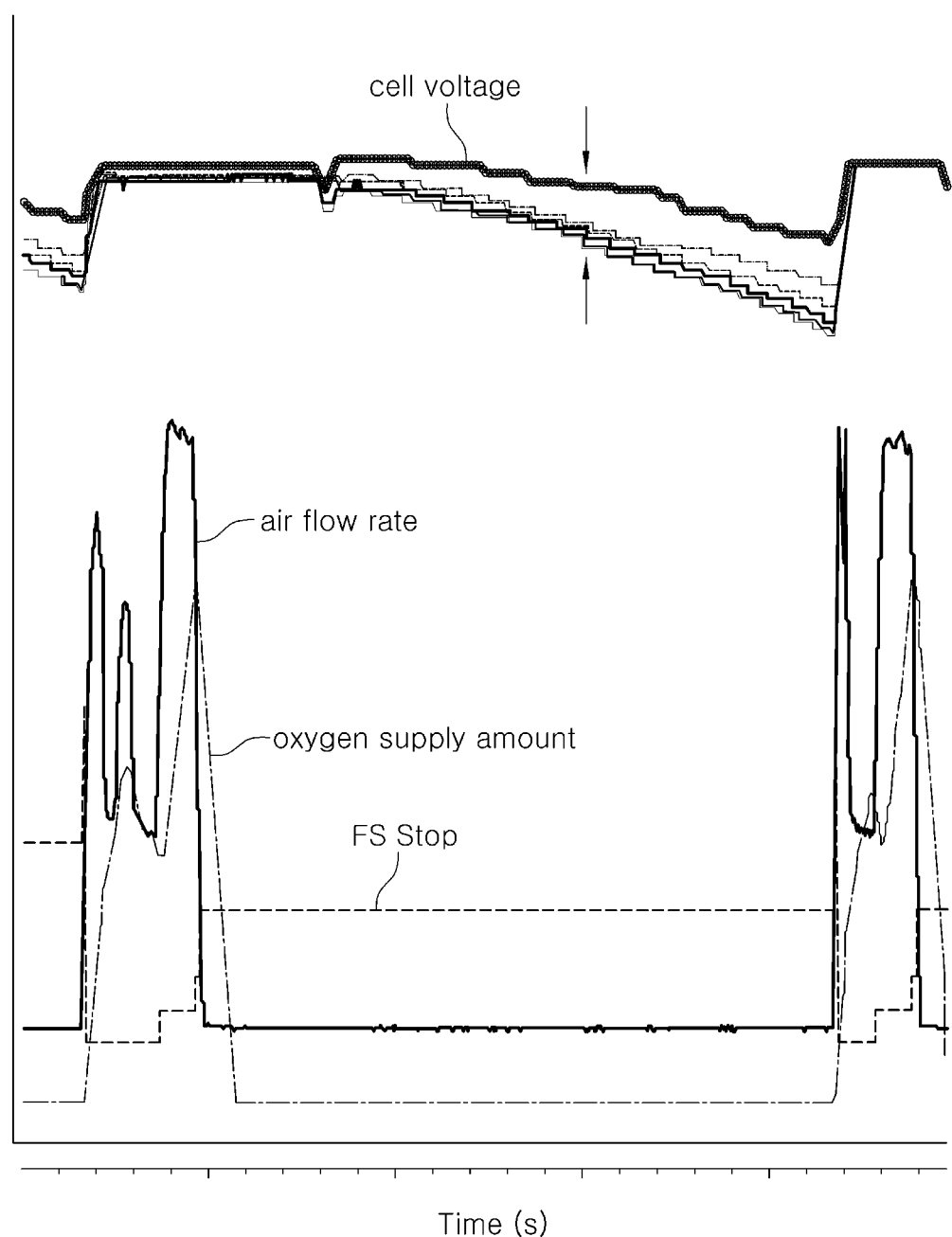
FIG. 5 illustrates a distribution of cell voltages in a fuel cell stop mode according to as the fuel cell stop mode is controlled according to an exemplary embodiment of the present disclosure.

FIG. 5 illustrates a distribution of cell voltages in fuel cell stop mode according to control of the fuel cell stop mode according to an exemplary embodiment of the present disclosure. Referring to FIG. 5 compared with FIG. 1, when the fuel cell stop mode (FC Stop) is entered according to the present disclosure, air may be additionally supplied, while entry of the fuel cell into the stop mode is delayed. Accordingly, compared with FIG. 1 in which air is immediately interrupted, rather than being additionally supplied, it may be seen that cell voltage variations are significantly improved in the present disclosure. In other words, according to the present disclosure, when the oxygen distribution state between the cells included in the fuel cell stack is not uniform, air may be additionally supplied to the fuel cell stack, and thus, cell voltage variations may be reduced and cells exposed to a high potential may be reduced, whereby durability of the fuel cell stack may be enhanced.

Although the present disclosure has been shown and described with respect to specific exemplary embodiments, it will be apparent to those having ordinary skill in the art that the present disclosure may be variously modified and altered without departing from the spirit and scope of the present disclosure as defined by the following claims

What is claimed is:

1. A method for a fuel cell stop mode, comprising:
operating an air blower to supply air to a fuel cell stack;
measuring, by a controller, an air flow rate supplied to the fuel cell stack;
when the fuel cell stop mode is entered, determining, by the controller, an oxygen distribution state between cells included in the fuel cell stack based on the measured air flow rate; and
adjusting the air supply based on the determined oxygen distribution state,
wherein
an oxygen consumption amount is estimated based on a charge amount obtained by integrating an output current of the fuel cell stack for a predetermined integration time,
an oxygen distribution state is determined based on a remaining oxygen amount obtained by subtracting the oxygen consumption amount from the oxygen supply amount,
the oxygen distribution state is divided into a plurality of stages based on the degree of non-uniformity of an oxygen distribution, and
the air blower is operated at a predetermined rotation speed, and a driving time of the air blower is increased correlative to the stages of non-uniformity.

2. The control method of claim 1, wherein, in the measuring of an air flow rate, a flow sensor is configured to measure the air flow rate of the air blower which supplies air to the fuel cell stack.

3. The control method of claim 1, wherein in the determining of an oxygen distribution state, when the air supply amount is equal to or less than a predetermined reference air amount, oxygen is determined to be unevenly distributed.

4. The control method of claim 1, wherein, in the determining of an oxygen distribution state, an oxygen flow rate in the measured air flow rate is estimated and an oxygen distribution state is determined based on an oxygen supply amount obtained by integrating the estimated oxygen flow rate for a predetermined integration time.

5. The control method of claim 4, wherein, in the determining of an oxygen distribution state, when the oxygen supply amount is equal to or less than a predetermined reference oxygen amount, oxygen is determined to be unevenly distributed.

6. The control method of claim 1, wherein, in the adjusting of air supply,
in response to determining that oxygen is unevenly distributed, air is supplied to the fuel cell stack, and
in response to determining that oxygen is evenly distributed, air supply to the fuel cell stack is interrupted.

* * * * *